P. C. HEWITT.
ELECTRICAL DISTRIBUTION SYSTEM.
APPLICATION FILED JUNE 9, 1910.

1,110,556.

Patented Sept. 15, 1914.

WITNESSES:
Chas. F. Clagett
Thos. H. Brown

INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,110,556.     Specification of Letters Patent.     Patented Sept. 15, 1914.

Original application filed May 2, 1903, Serial No. 155,308. Divided and this application filed June 9, 1910. Serial No. 566,045.

*To all whom it may concern:*

Be it known that I, PETER COOPER HEWITT, a citizen of the United States, and resident of Ringwood Manor, county of Passaic, State of New Jersey, have invented certain new and useful Improvements in Electrical Distribution Systems, of which the following is a specification.

My invention relates to an organization of circuits and apparatus whereby a continuous current work circuit may be supplied from an alternating current source.

The invention is illustrated in the accompanying drawings, in which—

Figure 1:
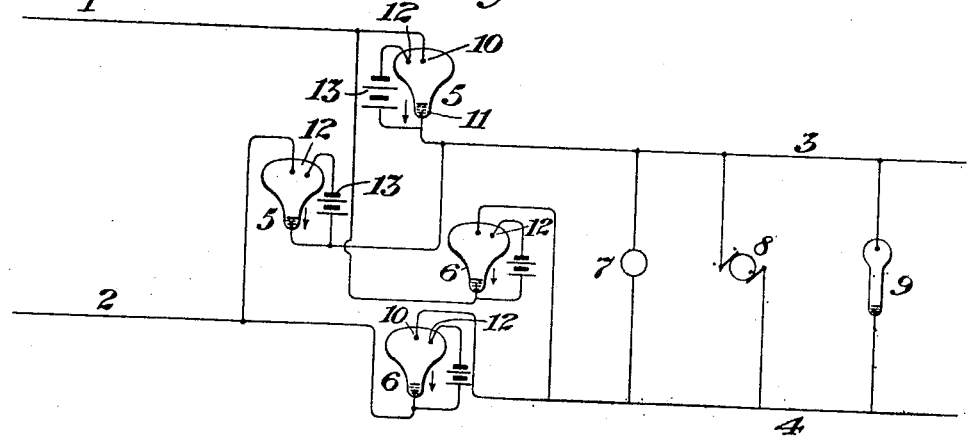
Figure 2:
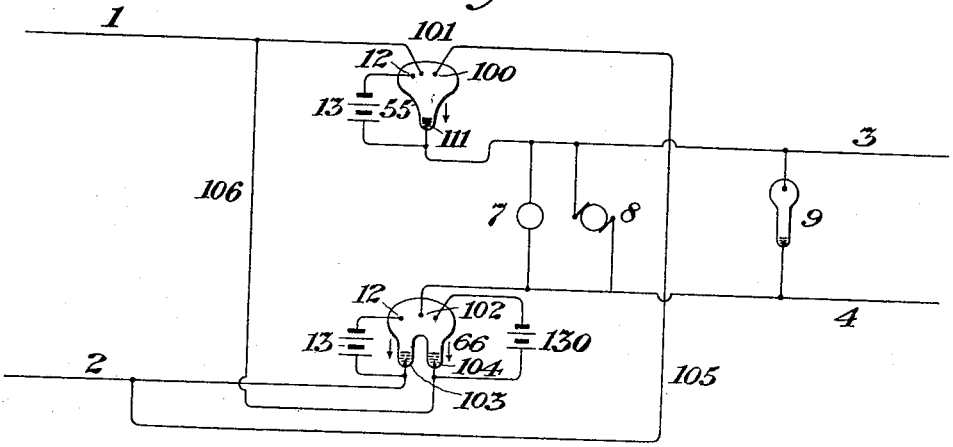
Figure 3:
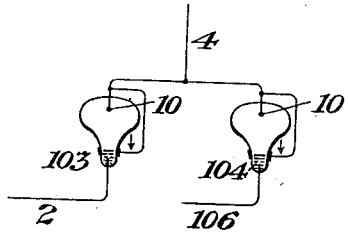

Figure 1 is a diagram representing a very simple organization adapted to serve the purposes of the invention; Fig. 2 illustrates a modification; and Fig. 3 is a modified system.

In the first figure of the drawing, 1 and 2 represent the mains of the supply circuit which may be connected to any convenient source of single phase alternating current. The mains of the work circuit are shown at 3 and 4. Between the supply mains and the receiving mains, I interpose a number of devices similar in their general character to the gas or vapor electric apparatus. Devices of this character as is now well known, possess the property of permitting the passage of electric current in a given direction while opposing a material resistance to flow of current in the opposite direction. Such devices are shown in the drawings at 5, 5 and 6, 6 and their direction of flow through the devices is indicated by arrows.

It will be observed that the devices numbered 5, are so placed with relation to the two circuits that the direction of flow is from the supply to the receiving circuit, while the devices numbered 6 are so placed that the directioin of flow is from the receiving to the supply circuit. It will be convenient to refer to the devices 5 as positive devices and to the devices numbered 6 as negative devices. It will be understood that impulses of one direction from the supply circuit will pass to the receiving circuit through the positive devices, while the impulses of opposite direction will pass from the receiving to the supply circuit through the negative devices. Under these conditions, the direction of flow through the work circuit will be uniform and the current supplied thereto will be adapted to operate through any translating devices requiring to be operated by currents of uniform direction. Such translating devices are shown at 7, 8 and 9, the first appearing as an incandescent lamp, the second as a direct current motor, and the third as a Cooper Hewitt lamp. These types are simply selected by way of example, and are not to be regarded as the only types capable of operation by the system herein described. It will be further understood that the single phase supply system has been selected on account of its simplicity and in order not to complicate the disclosure herein made.

Referring more particularly to the drawings of the transmitting devices 5, 5 and 6, 6, each of such devices may be briefly described as an inclosing chamber containing two electrodes, 10 and 11, and a suitable gas or vapor. One of the electrodes, as 10, may conveniently be of iron, copper or mercury, while the other electrode, 11, may consist of a small quantity of mercury or other material possessing the desired physical properties. An inspection of the drawings shows the connections to be such that one of the mains of the receiving circuit is connected to each of the supply mains through one of the positive devices, while the other main of the receiving circuit is connected to each of the supply mains through one of the negative devices. Each of the said devices, which may be described as vapor converters, may be provided with a supplemental or auxiliary electrode 12, connected with the positive terminal of a source, 13, of direct current, the other terminal of which is connected with the corresponding terminal, 11, of the same device.

In operating the converter there is initially a reluctance to starting, which may be overcome in any convenient manner, and this resistance once being overcome will remain overcome as long as the current continues to flow in the same direction. The flow thus established may be maintained, say by the direct current source, 13, or by any other suitable source of electro-motive-force which may be called upon to deliver currents or impulses in the proper direction at the proper time. In the operation of the apparatus each positive wave of the electro-motive-force from the generator will traverse one of the positive devices, thus reaching the work circuit, and will find a return circuit through one of the negative devices. Similarly, each negative wave will reach the opposite side of the work circuit through one of the negative devices and return through one of the positive devices. The resulting flow of current through the work circuit is always in the same direction. The source of supply for the mains 1 and 2 may be either an alternating generator or a transformer or any equivalent devices.

In Fig. 2 I show a similar arrangement of supply and work circuits, but I connect the same through two transmitting devices with more than two electrodes instead of employing four transmitting devices each having two electrodes. For example, the device 55 in Fig. 2 has two positive electrodes, 100 and 101, and a common negative electrode, 111; while the device 66 has a single positive electrode 102 and two negative electrodes, 103 and 104. The positive electrode 100 of the device 55 is connected by a wire 105 with the supply main 2, and the negative electrode 104 is connected by a wire, 106, with the supply main 1. The latter main conductor is directly connected to the positive electrode 101 of the device 55, and the supply main 2 is directly connected with the negative electrode 103 of the device 66. It may be found convenient to employ a battery, 13, as already described and to connect it to a third positive electrode 12 and the negative electrode, for maintaining a uniform direction of flow through the transmitting devices. In the device illustrated at 66 it will be found advantageous to supply a direct current to both the negative electrodes by means of some suitable source or sources such as 13 and 130.

The system illustrated in Fig. 2, while very simple, and utilizing a relatively small number of transmitting devices, accomplishes all the functions of the system shown in Fig. 1. For example, positive phases from the conductor 1 will pass through the device 55 by way of the positive electrode 101, the contained vapor and the negative electrode 111. On the other hand, positive impulses from the conductor 2 will pass through the wire 105 to the positive electrode 100 and thence through the vapor and the negative electrode 111. Returning through the work circuit, these impulses pass to the positive electrode 102 of the device 66, and, according as they are to seek a return to the generator by way of the conductor 1 or the conductor 2, they pass through the device 66 either to the negative electrode 104 or the negative electrode 103.

Fig. 3 illustrates a modified system of circuits in which a device having two main anodes and a cathode feeds the positive side of the work circuit and current is returned from the negative side thereof through two vapor electric devices having main anodes 10 and cathodes 103 and 104. The other numerals and elements have the same function and significance as have the same numerals and similarly related elements in Fig. 2. The exciting of the cathodes 103 and 104 may be accomplished as described for similar devices in my patents 682,690 to 682,699 inclusive, issued September 17th, 1901. Pertinent passages therein are the following:

"I have found it advantageous when the lamp is to be started without heating and by means of moderately high voltage currents to surround the glass or wall in the neighborhood of one of the electrodes, or in the case of an alternating current lamp each of the electrodes, by a band of conducting or semi-conducting material—such, for instance, as foil—which in turn is placed in electrical connection with the other electrode or grounded by means of a small conductor. This device appears to lessen, or neutralize to a certain extent at least, the surface tension or static charge which gathers about the electrode during the application of the starting current, and it reduces the effective starting resistance of the lamp. A lamp which would be started only by extremely high potential currents, if at all, without this band may be started without difficulty when it is present. When the lamp is once in operation under the influence of alternating or continuous currents of low pressures, the presence of the conducting-band seems to no longer exercise its function to the same degree, although it may remain without interfering with the operation of the lamp, as it is insulated from the neighboring terminal of the lamp."

"During the starting of the lamp by the application of higher potential currents a high static charge appears to occur near the cathode and upon the outer surface of the lamp, and this is removed or reduced by the presence of the band, connected through a conductor to the leading-in wire. In practice I have found that with this band removed or the conductor interrupted it is exceedingly difficult, if not impossible, to start the lamp with currents of reasonable electromotive force unless the lamp is heated by artificial means. The exact position at which the band may be located appears to differ somewhat in different cases, probably owing to the good conductivity of the gas coming from or forming part of the electrode. The proper position is usually slightly beyond the effective joint between the electrode and the gas."

"Surrounding the lower end of the tube, adjacent to and usually projecting a slight distance, say, one eighth of an inch above the level of the lower electrode, there is placed a thin band of conducting material—such, for instance, as foil—and this is electrically connected by a conductor with the leading-in wire of the anode."

This application is a division of my application Serial Number 155,308, filed May 2, 1903.

I claim as my invention—

1. In a system of electrical distribution in which current from an alternating source is rectified for use in a direct current receiving circuit, the combination with a plurality of rectifiers characterized by a high starting resistance which starting resistance substantially disappears in a given direction upon the establishment of current flow in that direction, alternating supply mains, connections between said rectifiers and said supply mains and means for overcoming the initial starting resistance of each of said rectifiers in a predetermined direction, of connections for passing rectified currents to the receiving circuit and means for returning such rectified currents to one supply main or the other after traversing the receiving circuit, said means consisting of two like current conducting devices connected in series across the mains and connected at their common point to the work circuit.

2. In a system of electrical distribution in which single phase currents are rectified for a receiving circuit through the agency of vapor rectifiers, the combination with vapor rectifiers adapted to withdraw successive impulses of current from the single phase alternating mains, and starting means therefor, of means for passing said current waves through the receiving circuit, means for returning said waves to the proper single phase main, said last named means consisting of two current transmitting devices connected in series across the alternating current mains and at the common point to the receiving circuit.

3. The combination with a source of alternating electric currents, of a supply system connected therewith, a direct current work circuit, and gas or vapor devices interposed between the said supply system and the said work circuit, such devices being provided with means for maintaining conditions which permit the flow of current between the supply circuit to one side of the work circuit in one direction only and between the other side of the work circuit and the supply circuit in opposite direction only.

4. The combination with a source of alternating electric currents, of a work circuit, means for transmitting the successive positive currents from the source to one side of the work circuit, and means for transmitting the successive negative currents through the other side of the said work circuit to the source and affording a return path for the successive currents through the work circuit, such means consisting of gas or vapor devices provided with means for maintaining a condition which permits the transmission as described.

5. In a system of electrical distribution, the combination with a single phase alternating source and a direct current work circuit, of two vapor electric devices, each comprising an exhausted container, a main anode and a main vaporizable cathode, each of said rectifiers constituting means for rectifying a train of current impulses from said alternating source for said work circuit and for separating the rectifying operations of the several trains of current impulses, means for connecting one of said anodes to one side of said source and for connecting the other anode to the other side of said source, a common connection from said cathode to one side of said work circuit and means providing a return circuit from the other side of said work circuit for the impulses alternately received from the opposite sides of the source, whereby the impulses from each anode find a complete return circuit through the source.

6. In a system of electrical distribution, the combination of a supply circuit including a plurality of terminals with a direct current receiving circuit, of a plurality of vapor rectifiers corresponding to the number of terminals of the supply circuit, each rectifier comprising an exhausted container, a main anode and main vaporizable cathode, said rectifiers each constituting means for rectifying a train of current impulses from one terminal of said alternating source for said work circuit and for separating the rectifying operations of the several trains of current impulses, a connection from each main anode to a terminal of the supply, a common connection uniting each and all of said cathodes to one side of said receiving circuit and means permitting the return of rectified currents from the other side of said receiving circuit to the source, whereby an impulse from any separate terminal finds a complete return circuit through the supply.

7. In a system of electrical distribution, the combination of a supply circuit including a plurality of terminals, a direct current receiving circuit, a plurality of vapor rectifiers corresponding to the number of terminals of the supply circuit, each rectifier comprising an exhausted container, a main anode and main vaporizable cathode, said rectifiers each constituting means for rectifying a train of current impulses from one terminal of said alternating source for said work circuit and for separating the rectifying operations of the several trains of current impulses, a connection from each main anode to a terminal of the supply, a common connection uniting each and all of said cathodes to one side of said receiving circuit and means permitting the return of rectified currents.

8. In a system of electrical distribution in which the rectification of several trains of impulses from an alternating supply for use in a direct current work circuit is obtained through the rectifying action of anodes and cathodes in an exhausted space and in which a separate anode is used for the suppression of wrongly directed supply impulses in each train of waves, means for separating the rectifying operations of the several trains of waves, said means consisting of separate containers for each anode and its corresponding cathode in combination with means for passing the work currents from the various trains of supply impulses into said work circuit.

9. In a system of electrical distribution, including an alternating source having a plurality of supply points, vapor rectifiers characterized by exhausted containers, and a receiving circuit, the method of preventing abnormal flow of current from one supply point to another supply point without traversing the work circuit which consists in rectifying the current impulses passing from the several supply points in said rectifiers independently and separately and then supplying them jointly upon the receiving circuits.

10. In a system of electrical distribution in which a plurality of chains of similar waves of current from an alternating source are rectified for use in a direct current work circuit, each through the agency of the starting resistance of an anode in an exhausted space, the method of securing stable operation, which consists in isolating the several rectifying anodes so that each when impressed with voltage impulses in the direction opposite to that of its useful current impulses shall be protected from the influence of currents then actually flowing in the system from another anode.

Signed at New York in the county of New York and State of New York this 8th day of June A. D. 1910.

PETER COOPER HEWITT.

Witnesses:
Wm. H. Capel,
Thos. H. Brown.